Aug. 5, 1969   L. H. HUTFLES   3,459,839
METHOD OF MAKING AND REPRODUCING SURFACES CAPABLE OF
ORIENTING NEMATIC DICHROIC MATERIALS
Filed Oct. 14, 1964   2 Sheets-Sheet 1
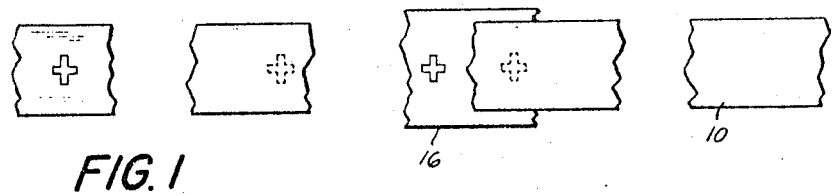
FIG. 1
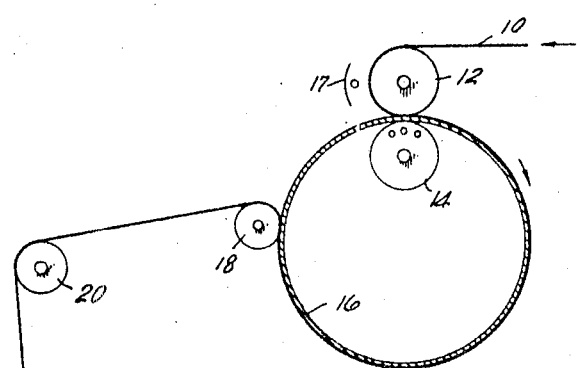
FIG. 2
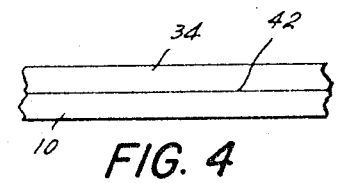
FIG. 4
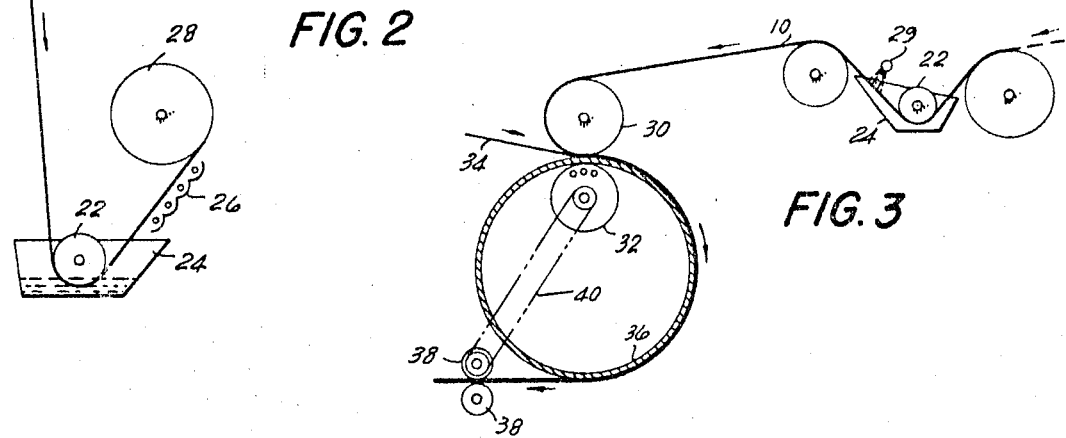
FIG. 3
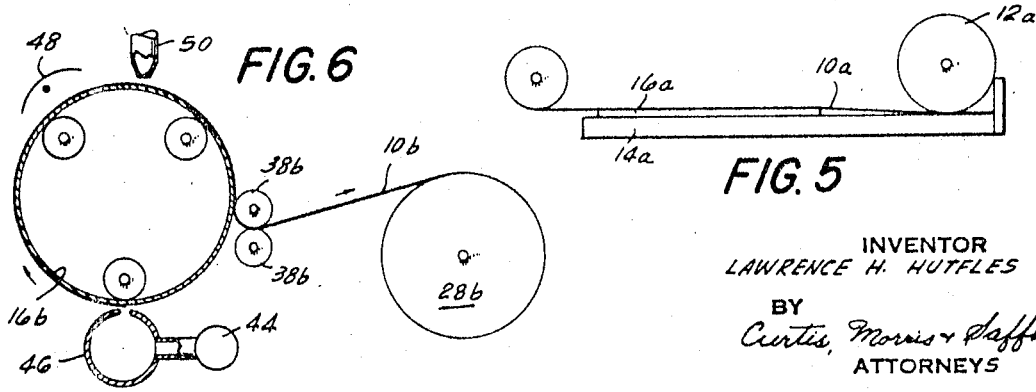
FIG. 6
FIG. 5
INVENTOR
LAWRENCE H. HUTFLES
BY
Curtis, Morris & Safford
ATTORNEYS

INVENTOR
LAWRENCE H. HUTFLES 3,459,839
METHOD OF MAKING AND REPRODUCING SURFACES CAPABLE OF ORIENTING NEMATIC DICHROIC MATERIALS
Lawrence H. Hutfles, Hamilton, Ohio, assignor to John F. Dreyer, Blue Ash, Ohio
Filed Oct. 14, 1964, Ser. No. 403,753
Int. Cl. B29d 7/20, 11/00; G02b 1/08
U.S. Cl. 264—2                        6 Claims

ABSTRACT OF THE DISCLOSURE

A method and apparatus for establishing transmitting light polarization patterns upon and transmitting to receptor surfaces; by softening a receptor material; contacting the receptor material to a matrix so that the molecules thereof respond to orienting forces of a matrix; and removing from the support leaving the orientation pattern on this matrix undisturbed.

---

This invention relates to production of light polarizing films. More particularly, it relates to the making and reproduction of light polarizing patterns on surfaces which transmit or reflect light.

It is well known that certain materials go through a metamorphic, "liquid crystalline," state in which their molecules fall into parallelism. Left to themselves, the parallelism is on different directions in different areas giving a mosaic appearance. For a long time this was an interesting but useless phenomenon; but it was shown by Dreyer (U.S. Patent 2,400,877) that this natural tendency to alignment could be used commercially for light polarization if a uniform orienting influence was present at the time the material came into the nematic state, and that even the relatively slight orienting force resulting from pre-rubbing or -brushing the surface used to support the nematic material would suffice to initiate the alignment of molecules on the desired lines of orientation, and other molecules would then follow necessarily by the nature of their nematic behavior.

In a later patent No. 2,524,286 Dreyer has shown how a film of a dichroic dye which has been uniformly oriented in this way, in spite of its very delicate nature, can be subsequently stripped from its supporting surface and transferred to another surface in a manner analogous to decalcomania.

It has also been shown that certain plastic films, because of the methods of their manufacture, have inherent parallelism of molecules, which can be developed into a light-polarizing condition by scorching, to darken the oriented material or by exposing to reagents which add a chromophore, or molecular part which brings about a darkening. These darkened portions of the material are found to be darker when viewed with transversely polarized light than with ordinary light or parallel-polarized light. Other techniques of developing light-polarized characteristics in a light-transmitting or -reflecting material have been known and published in the art.

I have now discovered that one can easily transmit to successive receptor surfaces polarization patterns of a master such as develop naturally, e.g., by crystallization or by rubbing a surface of the master along lines of desired polarization, e.g., as an artist might apply to prints with oriented brush strokes in different directions to emphasize or develop depth effects, etc., whether uniformly over an entire area on the master or in different directions on different smaller areas, for more complex patterns. This is accomplished according to my invention, if the two are in intimate surface contact while the material of the receptor is softened so that its molecules can respond to orienting forces, and if the materials of both have polar molecules of such geometry that the attractive forces at the surface act to orient such molecules of the receptor into parallelism. This I achieve by exposing to heat or a solvent the receptor surface in which orientation is desired, while the contacting master surface is maintained under conditions such that its molecules are held against re-orienting.

In the simplest case, a sheet (which I designate the "master" when it is the original pattern but will refer to broadly as the "matrix" to include a later copy when it is being used to control orientation) is parallel-oriented throughout, e.g., by rubbing always parallel to a single directrix. When such matrix is pressed against a softened body of a polar plastic, the molecules of which have substantial freedom of orientation, the same pattern of orientation is reproduced on the softened body (which I call the "receptor"). There need be no visible indication on the receptor that it has been thus oriented, although if there are surface irregularities or patterns on the matrix, they can be expected to appear molded into the contacting surface of the receptor. However, when the surface is treated to make it light-polarizing, e.g., with a nematic dichroic dye as set forth in the Dreyer patents, the dichroic material will be oriented accordingly and will thus polarize light.

A most important discovery which I have made in connection with this is that it is now possible to reproduce a light-polarizing pattern or other anisotropic surface characteristic in multiple copies from a master, or matrix, by a technique analogous to ordinary printing. Thus, a first copy (which I shall call the "master") is made by rubbing the surface of the body (ordinarily a plate or sheet or film) which is to form the master, with the direction of rubbing in each area uniform and corresponding to the polarization desired in that area. Thus I make, and can reproduce indefinitely, patterns of polarization. This handmade master can be put in a press with a sheet or plate of polar thermoplastic which is to receive the oriented pattern, its surface being softened by heat or solvent, and then allowed to set while the matrix is in intimate contact.

Surprisingly the only copy made in this way can be used as the matrix for producing other copies for ultimate use, e.g., as light polarizers, etc., or for producing other matrices for use on other presses to increase production.

Although it is not fully understood, at the present time, how this occurs, it may be that the rubbing or other orientation of the matrix, which forms the orginal latent image, orients polar molecules at the surface of the matrix; and that these, in turn, when brought into intimate relation with polar molecules of the copy material, exert field forces which pull the latter into alignment with the former. This conclusion is supported by the fact that it has been found important to treat the surface of the copy material in a way which frees its molecules to re-orient, e.g., by heating to soften the surface or softening, etc. Whatever the explanation, the fact is, as I have demonstrated, that an unlimited number of copies can be made from a single matrix having an oriented pattern at its surface, by bringing the two into close surface proximity while the molecules of the copy material are mobile so they can respond to whatever orienting forces the matrix exerts; and that the making and stripping of such copies does not destroy, nor appreciably deteriorate, the master, or matrix.

Previous experience had led to the belief that the field forces exerted by a rubbed surface were extremely weak and that their ability to orient adjacent molecules was surprising and depended on the peculiar conditions of the nematic state and would not be sufficient to orient a large molecule in a plastic.

I have further found, according to the present invention, that the oriented pattern can be transmitted, not only to successive materials applied onto the matrix, but successively from one matrix to a responsive copy material and then, when that material is set with the oriented pattern, it can in turn transmit the pattern to another soft material, and so on through an indefinite number of generations. This has the practical advantage that a matrix, which can be used like a printing plate to form an indefinite number of copies, can be formed of a plastic film and such film can then be used as the matrix. A single matrix can thus make any number of reproduced matrices, each of which can turn out multiple copies of the original. For example, surprisingly, the films with polarized images now need no release additives and can have good bond to its substrate. The strip-off plastic film can be much stronger than the dichroic film and is less apt to break during the strip-off.

The surface of the matrix has not been found to be critical, nor does normal handling substantially impair the matrix. The repeated application of the sheet-forming material and its stripping from the matrix keeps the surface of the matrix clean.

Where a continuous process of making multiple copies is desired, I prefer to curl such a matrix to cylindrical form on the surface of a drum or, if the matrix is a metal sheet, or other stiff material, it may itself form the surface of a drum; or it may be merely a "floating" cylinder carried between rollers and driven 'round and 'round by their rotation; or it may even be a loop of flexible plastic which hangs from the pressing rolls and continually passes through the bite of the rolls during operation.

As indicated above, it is desirable that the plastic material of which copies are being made, should be softened adjacent the contacting surface to facilitate re-orientation of molecules therein. To this end, I have found it advantageous to heat the plastic material, or less advantageously, to soften with a solvent, at, or close ahead of, the position at which pressure is applied to bring the oriented surface and the plastic copy material into intimate contact; and, beyond the point of pressing these together, the plastic should be cooled so that it is set on the matrix before being stripped. In order to do this efficiently, the matrix or the supporting cylinder, or other carrier, is made thin, with as little heat capacity as possible. Thus, the cylinder, or other loop of the matrix, as it passes beyond the heated press roll, is exposed to the atmosphere, or to a blast of cooling fluid, so that it is quickly set, fixing the latent image induced in the copy by the contiguity of the oriented image on the matrix. The oriented copy is then stripped off from the matrix, which moves on toward its initial position adjacent the pressing rolls, where additional plastic material is supplied, and is then passed under the pressure roll to form another oriented copy by repetition of the process. This can be done at a speed which is entirely economical; in fact, we have, in successful runs, operated at speeds varying respectively from nine inches per minute to more than two feet per minute, and this range, although advantageous, can be exceeded at both ends.

The plastics used, and the dichroic materials used, may be the same as those used in the prior art for making such latent images and for developing them into light-polarizing plates or films; for example, the materials mentioned in the Dreyer patents above referred to. I have found that for best results the plastic of the film should be one having polar linear molecules and high tensile strength, relatively high melting point, and toughness (in the strict sense of energy absorbed in its deformation). For the plastic film, some of the newer materials have been found particularly advantageous, for example, Videne (sold by Goodyear Tire & Rubber Co.), Mylar (sold by E. I. du Pont de Nemours), Terafilm (sold by Terafilm Corp. of Stamford, Conn.), and other commercially available terephthalate polyester films. I have found that the para terephthalates are better for present purposes than those in which the two active groups are not in the para arrangement. Also, it is better to use films free from molecular orientation produced in manufacture of the film. For additional detail on these materials see "Polymers and Resins" by Brage Golding (Van Nostrand), page 285, U.S. Pat. No. 2,965,613, and the Soc. Photograph. Eng. Jour. (1961) vol. 17, No. 10, pp. 1–5.

In the accompanying drawing I have shown a preferred embodiment of my invention; and although I shall point out herein certain modifications and alternatives, it should be understood that these are given for purposes of illustration, in order that others skilled in this art may fully understand the invention and be enabled to modify and adapt it as may be best suited for conditions of various practical uses.

In the drawings:

FIGURE 1 is a fragmented sequential diagrammatic plan view showing a film at successive stages of treatment according to this invention;

FIGURE 2 is a diagrammatic view in side elevation of an apparatus for carrying out the invention;

FIGURE 3 is a similar view of another apparatus for carrying out my invention;

FIGURE 4 is a diagrammatic edge view of a product of the invention;

FIGURE 5 is a view in side elevation of a simple hand press for use in carrying out the invention;

FIGURE 6 is a diagrammatic view in vertical section of the machine for carrying out the invention, in which a plastic film is cast onto the matrix where it is oriented.

Figure 7:
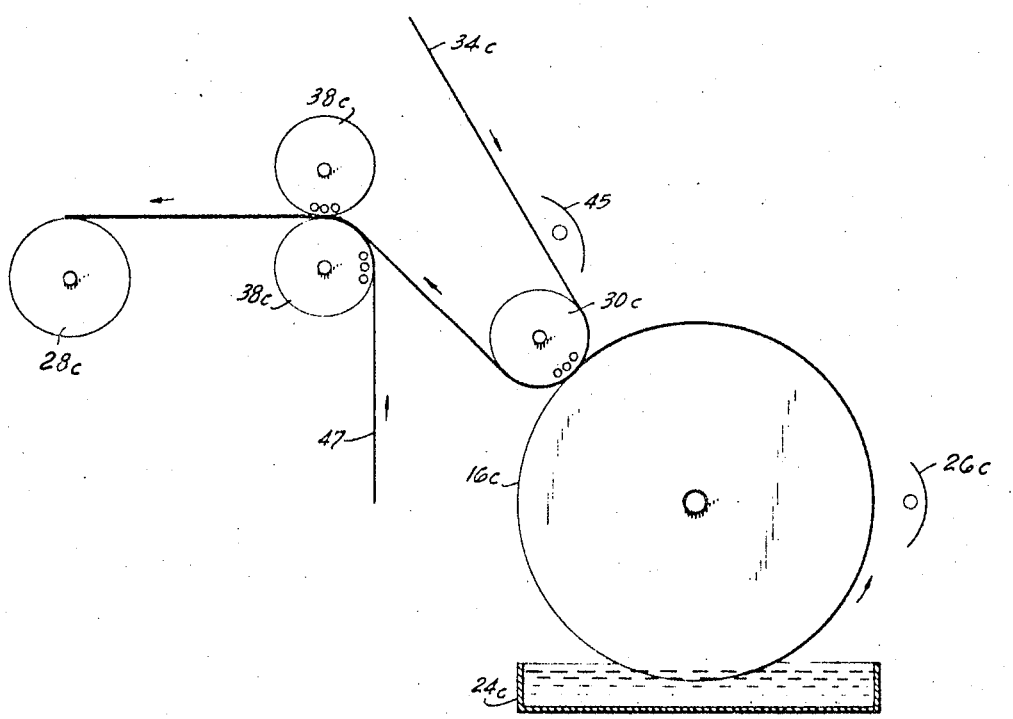
FIGURE 7 is a similar diagrammatic view of a machine for continuous reproduction of preferred images by applying a tacky film to a solidified film of dichroic dye.

Referring first to FIGURES 1 and 2, I have there shown a machine for continuous multi copy reproduction of oriented images and polarized images.

The film 10 is to be printed comes from a supply roll (not shown) and feeds to the machine, for operation of my invention, over a press roll 12, around its periphery and through the bight between it and back-up roll 14 where it is pressed onto the matrix 16.

The roll 14 is heated at, and for a short distance ahead of, the bight so as to give the desired softening of the receptor film 10. This heating should be such that the film flows appreciably, and into surface conformity with the film 10, when they pass through the bight of the rolls 12–14. If desired, a radiant or other heater may also be used, e.g. as indicated at 17, to preheat the surface of film 10 just before it comes in contact with the matrix. Insofar as the heat is supplied to roll 14 so that it has to pass through the wall of that roll and the matrix 16 to reach the film 10, it is, of course, necessary that the matrix be of a material substantially more resistant to heat than the film 10. The film 10 in the preferred embodiment may be very thin, e.g., 1 mil.

The degree of heating at this point is such that the surface of sheet 10 which contacts the matrix 16 will be softened and flowed into conformity with the matrix surface, e.g., with a Videne film 10 and an aluminum matrix 16 the heating is controlled to raise the contact surface of film 10 to a temperature well above 140° F. and most advantageously in the range 160°–175° F., or with "Lexan," a polycarbonate film, the temperature should be about 300° F. This softens the plastic of the film (which is a linear and polar polymer) so that individual molecules can respond to the forces of the adjacent surface of the matrix and orient respectively to the imposed pattern.

The sheet 10, after being pressed onto the matrix 16, continues on the surface while it is being cooled (e.g. to below 140° F., ordinarily in the range 85–140° F.), so that the plastic sets, as it moves around to the roll 18, by which it is stripped off the matrix. Generally this cooling requires a mild blast of air or other cooling fluid which may be blown onto the back of film 10 or may be blown onto the inside of drum 16 or both. Or, if operation is not too fast and ambient temperature is low enough, the film may be only partly cooled by exposure to the atmosphere on the matrix 16 and then can get a final chill if the roll 18 has a coolant supplied to it. Thus, when the sheet 10 is tripped from the matrix 16, the plastic is set so that the oriented pattern which has been imposed on it by the matrix must remain and is not disturbed when it is stripped off.

From roll 18 the sheet 10 passes on over an idler roll 20 and then down and around the roll 22 which is half submerged in tank 24 in a bath of dichroic dye solution, which as it goes through the nematic state on drying, produces a light-polarizing film having the same orientation as had been imparted to film 10. In order to assure rapid drying of the dye solution, a bank of radiant heaters (e.g. infra red lamps) is provided, as shown at 26. When thus dried, the sheet 10, now having finished multiple copies thereon, is rolled up on roll 28, or the individual copies can be cut off at this point and delivered individually flat.

The matrix drum 16 is advantageously made of aluminum sheet rolled to a cylinder with its ends welded or otherwise interlocked. The oriented pattern is advantageously made while the metal sheet is flat and can well be by use of a motor-driven rotary rubbing pad or brush served with very fine jeweler's polishing rouge. This can be done with a dentist's drill or a portable hand motor. With such a tool, an artist can make oriented patterns with the orientation varied at will for various parts.

One can thus rub orient and polarize on metal. Such metal can be in any form such as a bar, plate, sheet, tube, or foil. For example, a pattern is rubbed onto aluminum foil using brush strokes or rotation of a felt impregnated with a slurry of polishing rouge and water. The pattern is rubbed over approximately ten times to insure complete orientation. Any remaining rouge is then rubbed off. When a solution of a nematic liquid-crystal-forming dye is applied and then dried at a speed where the molecules of the dye freezes rapidly from the nematic state, the dye shows the rubbed orientation pattern.

The metal, or other, sheet which forms the matrix and the periphery of the drum or loop is advantageously quite thin to allow for rapid and efficient heating and cooling and to reduce heat transfer along the sheet. I have found, for example, that an aluminum belt .010″ thick is very advantageous for this purpose; but I may use a foil of much lesser thickness, alone or laminated to a less conductive sheet or film, e.g., of "Lexan," a polycarbonate plastic (cf. Pat. 3,027,352), or "Mylar," a terephthalate polyester plastic. A roller with peripheral matrix of aluminum .02″ in thickness is also good and an 8″ diameter aluminum tube of 1/16″ wall thickness has been used successfully for test; but such thicker walls will, of course, be slower to heat and cool, necessitating larger diameter rolls or loops, etc., or a slower rate of travel to give more time for the heating and cooling. The speed of the rolls, etc., its peripheral length, its thickness, the temperatures of the heating and cooling and the temperature of transferring the orientation, are all interrelated, so that each may be varied if appropriate adjustment is made with the others.

Advantageously, the matrix is curled to a circular cross section so that it is not subjected to alternating strains during continuous operation, as such strains might impair the desired orientation.

The receptor film, which takes the orientation of the master or matrix is advantageously a thermoplastic linear polar polymer; but, if soluble in a volatile solvent, selective so that it does not damage the matrix or master, but which can soften the surface of the receptor and then be removed by evaporation, soluble but infusible plastics can be used. The receptor film, instead of being preformed and softened at the time it is brought into contact with the matrix, may be formed on the matrix by casting a solution, a melt, or a plastisol, e.g., as set forth below in connection with FIGURE 6.

The plastic used for the receptor should be one which will accept a suitable coating of a solution of a material which dries through the nematic state to a dichroic or birefringement film.

The master can be any of the materials which are, or can be, oriented to retain a polarized pattern, including, among others, glass, plastics, minerals, metal, etc. Advantageously the surface should be non-porous.

The choice of the receptor film and the matrix material are inter-dependent, as the receptor must be heated above its softening point or softened by a solvent without softening the matrix. Thus, the master can be aluminum and the receptor polycarbonate film, which softens at relatively high temperature; and subsequently the polycarbonate can be used as matrix with a Videne terephthalate polyester film as the receptor, or "Ethocell," a transparent ethyl cellulose film, or cellulose acetate butyrate film.

I may also laminate such films of different melting points so that the strength of the higher melting point film, e.g., Lexan, will remain even if the lower melting point of the other film, e.g., Videne, should be exceeded or the feed should be temporarily stopped so that the melting goes deeper than expected.

This technique of pressing two films together while one is heated above its softening point can be used to advantage not only for this transfer of oriented patterns, but also for picking up a polarizing film of dichroic dye, etc., from a base on which it is formed, and also for simple lamination of films.

Turning to FIGURE 3, I have shown an alterative arrangement of the machine for continuous production of multiple copies of oriented patterns. In this instance, the film feed 10 and heater and press rolls 12, 14, and the matrix roll 16 with its take-off roll 18, remain the same as in FIGURE 1, and therefore are not repeated in this figure. The dipping tank 24 with the polarizing solution and its roll 22 are replaced by the spray coater 29 located at a higher level because the film is thereafter passed on to laminating rolls 30, 32, at least one of which is heated to a temperature above the softening point of a cover film 34 (or cementing layer on said film) but below the softening point of the film 10. Thus, as the two films pass through the bight of rolls 30–32, the films are securely adhered to one another. Thus, the light-polarizing coat on the film 10 is protected from scratching or other damage. As before, the multiple copies may be kept together and rolled up or can be severed and delivered in stacks, e.g., using standard techniques common in the printing trade.

In the preferred embodiments shown in FIGURE 3, the heated roll is 32, as the laminating film is on the underside, and the upper roll 30 is covered with a heat-resistant rubber, e.g., silicone rubber. A pivoted drum or "floating" cylinder or belt 36 carries off the laminated film, advantageously keeping the layers pressed together by maintaining tension on the laminate. This is done by feeding the laminate from the cylinder 36 between rollers 38 which are geared to the rolls 30–32 by a sprocket chain (or gear train) 40. To this end, the rolls 38 are operated at a slightly higher linear speed than 30–32, e.g., by making the diameter of 38 slightly greater than that of 32; but this should not be so much as to produce objectionable stretching of the film such as might disturb the desired orientation.

In FIGURE 4 is shown an enlarged diagrammatic representation of the laminated product. As shown, the image film 10 carrying the latent image, is on top with its dichroic polarizing coat 42 having the developed image on its bottom face, and this is covered by the cover film 34.

FIGURE 5 shows a flat bed press type of apparatus for making flat copies one after another. This is shown, for simplicity, in the form of the well known hand proofing press used in the printing trade. The bed 14a of the press has secured thereon a master plate 16a with a rubbed image to be reproduced. This plate is heated by a heating element (not shown) as in FIGURE 2. Onto this master are laid successively cut sheets of receptor film 10a; and, after each is laid in place, the roll 12a is rolled across the sheet, picking up the end of the sheet as the roll goes over it, so that the sheet is wrapped around the roll and cooled after it is pressed against the hot matrix. This leaves the sheet with the latent image of oriented molecules, as in the case described above. The cooled sheet is taken off and the operation repeated. This is not as satisfactory as the continuous rotary operation of FIGURES 2 and 3, both because of its slower operation and because the sheet is not left on the matrix while it cools.

FIGURE 6 is similar to FIGURES 2 and 3, except that the film 10 is cast directly on the matrix 16b and takes the latent image immediately. A plastisol is fed from manifold 44 into a slit tube feeder 46 just below the matrix roll 16b. A film of the pastisol is spread onto the matrix 16b and is carried up to the radiant heater 48, where it is solidified by inversion of phases. The film is again cooled by air blast at 50 and eventually is reeled up at 28b. In this case, the condition in which the molecules are free to respond to the orienting influence of the matrix is the cold condition in which the plastisol is fully liquid. Heat sets it in the oriented condition. In this case, as in the case of FIGURE 3, the rolls 38 may keep the film under tension by being driven at slightly faster surface speed than the roll 16b.

FIGURE 7 shows a roll 16c, the surface of which carries the latent image orientation as in the other figures. The bottom of this roll dips in a coating solution of a dichroic dye, e.g., according to the Dreyer patent referred to above. This solution is shown as carried in a pan 24c just beneath roll 16c. As the roll rotates, it carries a film of this coating solution on its surface and as this comes into the open atmosphere above the pan 24c, it begins to dry. A radiant heater 26c is shown for accelerating this drying so that the film passes quickly through its nematic state and is solidified and oriented as it comes to the top of the roll. Just beyond the top is a heated laminating and take-off roll 30c and a thermoplastic substrate or carrier sheet 34c is fed to this. The cover sheet is softened to a surface-tacky condition by the heater roll 30c (and, if desired, by an auxiliary radiant heater 45 acting on the surface which will contact the dichroic film). The tacky sheet 34c adheres to the dichroic film so as to pick it off from roll 16c and the thus laminated sheet passes on between heated press rolls 38c where another thermoplastic sheet 47 is stuck onto the laminate and the whole is pressed together. The choice of plastic or plastics used for this lamination is not critical; vinyl plastics or cellulose acetate can be used with or instead of those mentioned above. The requirement is that it must have a tacky surface at the time of lamination, and if the film itself does not provide that (e.g. as with cellophane or ethyl cellulose), it may have a thin cementing coat on its surface.

Release agents can be used to facilitate transfer of these films, e.g., as set forth in the Dreyer Patent No. 2,524,286. Methyl cellulose provides good release for Videne polyester film; other materials I have used as release coatings are silicone oils, polyethylene, "Vydax," and "Glide" (a polyfluorocarbon).

The invention claimed is:

1. The method of making sheets adaptable to treatment with a nematic dichroic material to render them light-polarizing, which method comprises forming a matrix with an image area by orienting surface molecules thereon differently in different parts of the image area respectively to form at least a latent image in the matrix, flowing a transparent polar polymer plastic into intimate surface conformity with said matrix in the image area, whereby surface molecules of said plastic are drawn into parallelism with those of said latent image, setting the plastic, and stripping the plastic from the matrix.

2. The method as defined in claim 1 wherein the matrix is formed with a latent image by orienting surface molecules differently in different areas thereof by rubbing in various directions and locations corresponding to a design pattern, and said pattern of orientation is reproduced in said transparent plastic by the molecular forces exerted by oriented molecules of said matrix upon the surface molecules of said plastic.

3. The method as defined in claim 1 which further comprises rendering said transparent plastic sheets light-polarizing by applying a dichroic dye thereto in the nematic state and setting the dye so rapidly as to maintain its conformity to the molecular orientation of the surface of said plastic.

4. The method as defined in claim 1 wherein said plastic is a sheet of thermoplastic material and at least the surface of said sheet facing the oriented surface of said matrix is heated to a temperature at which the plastic is soft and flowable, said plastic is flowed into intimate surface contact with the oriented surface of said matrix, and the sheet is cooled to set the plastic against further flow before the sheet is stripped from the matrix.

5. The method of making sheets having a predetermined molecular orientation at the surface thereof, which method comprises orienting surface molecules of a matrix to a predetermined pattern, pressing a receptor material into intimate contact with the oriented surface of the matrix, at least the surface of said receptor material being softened sufficiently so that the molecules thereof respond to the aligning forces of adjacent molecules of the oriented surface of the matrix, setting said softened receptor material without disturbing the orientation thereof, and stripping the resulting surface-oriented material from the matrix while leaving the orientation of the matrix intact.

6. The method as defined in claim 5 wherein the orientation of the surface molecules of the matrix is effected by rubbing parallel to a single directrix in different areas thereof and respectively pressing said areas thus rubbed against the receptor material to effect corresponding orientation of the adjacent areas of said receptor material.

References Cited

UNITED STATES PATENTS

| | | | |
|---|---|---|---|
| 2,400,877 | 5/1946 | Dreyer | 350—155 |
| 2,524,286 | 10/1950 | Dreyer | 350—155 |
| 3,196,062 | 7/1965 | Kristal | 264—284 |
| 2,380,363 | 7/1945 | Land et al. | 264—2 |
| 3,235,631 | 2/1966 | Shelanski | 264—2 |

JULIUS FROME, Primary Examiner

A. H. KOECKERT, Assistant Examiner

U.S. Cl. X.R.

101—32; 264—78, 284, 293; 350—153